June 7, 1949.                    H. P. HOOD                    2,472,660
                         APPARATUS FOR MOLDING GLASS
                             Filed Feb. 25, 1944
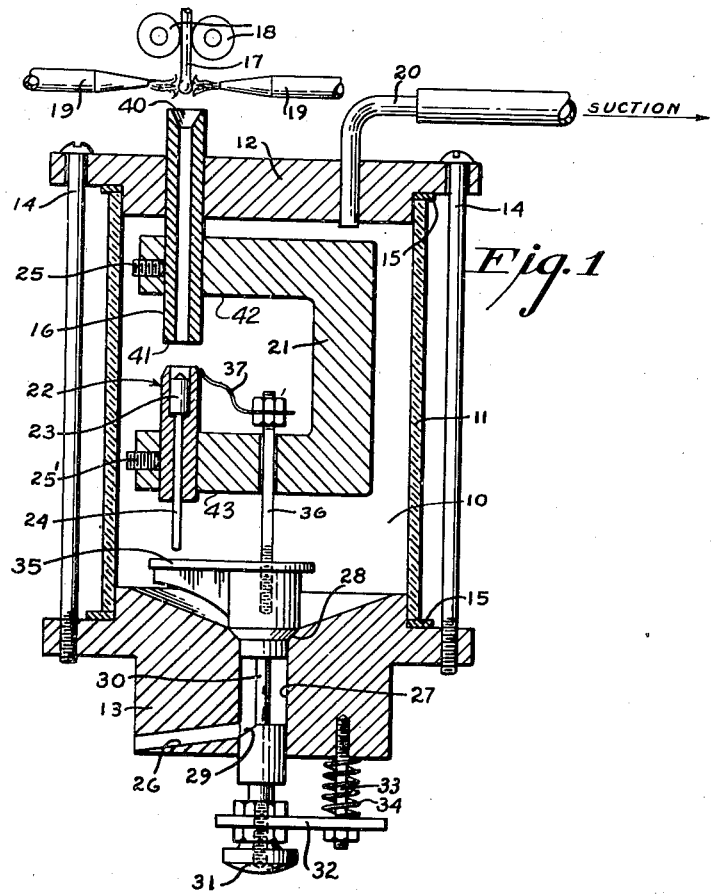
Inventor
HARRISON P. HOOD
By F. H. Knight
Attorney Patented June 7, 1949

2,472,660

UNITED STATES PATENT OFFICE 2,472,660

APPARATUS FOR MOLDING GLASS

Harrison P. Hood, Corning, N. Y., assignor to Corning Glass Works, Corning, N. Y., a corporation of New York Application February 25, 1944, Serial No. 523,874

3 Claims. (Cl. 49—29)

1

This invention relates to the molding or shaping of plastic glass with a mold and has for its primary object the shaping of a plastic mass of glass by means of a mold but without the use of a plunger.

Another object is to provide an apparatus for shaping glass in a mold without a plunger.

Another object is to provide an apparatus for high speed production of very small articles of glass.

Another object is to provide an apparatus for high speed production of glass jewels for the bearings of delicate instruments.

The above and other objects may be accomplished by practicing the invention to be more fully described in the following specification, claimed in the appended claims and illustrated in the accompanying drawings in which:

Fig. 1 is an elevation partly in section of a glass shaping apparatus adapted for the production of small glass articles such as bearing jewels in accordance with my invention;

Fig. 2 is an exaggerated cross sectional view of a glass bearing jewel made in accordance with my invention.

In Fig. 1 a closed chamber, generally designated 10, has sidewalls which in the present instance are composed of a glass tube 11, but which may be composed of other materials such as metal. The tube 11 is provided with end closure members 12 and 13 secured by bolts 14 and sealed to the tube 11 with gaskets 15.

The closure member 12 is provided with a gob delivery tube 16, having a receiving end 40 and a delivery end 41, which is composed of metal and which passes through the member 12 and is firmly attached thereto. The delivery end 41 of the tube 16 is within the chamber 10 and the receiving end 40 is outside the chamber and adjacent a gob feeding means which in the present instance comprises a glass rod 17 fed by rollers 18 through the flame of burners 19. Member 12 is also provided with a suction tube 20 through which a subatmospheric pressure may be produced within the chamber 10 by suitable evacuation means, such as a vacuum pump (not shown).

Within the chamber 10 tube 16 passes through leg 42 of a U-shaped mold support 21 which is held rigid on tube 16 by a set screw 25. Arranged below tube 16 a mold assembly, generally designated 22, passes through leg 43 of support 21 and is adjustably held thereto by a set screw 25'. Mold 22 has a movable bottom 23 adapted to be raised by a pin 24.

The closure member 13 is provided with a vent

2

26 which communicates with the chamber 10 through an air lock comprising an intermediate chamber 27. The air lock is provided with a poppet valve 28 and a piston valve 29. The valves are mounted on a rod 30 which extends through the piston 29 and is provided with an end knob 31 and a cross bar 32. The latter is also slidably attached to a pin 33 which is rigidly mounted in the outer face of the closure member 13 and which is provided with a compression spring 34. The spring 34 acts through the cross bar 32 and rod 30 to hold the valve 28 in a normally closed position, the valve 29 being at the same time so adjusted as to leave the vent 26 open. Pressure on the knob 31 will compress the spring 34 at the same time moving the valve 29 to close the vent 26 and lifting the valve 28 to place the chambers 10 and 27 in open communication.

The valve 28 is provided with a side arm 35 extending laterally beneath the pin 24 and a rod 36 extending vertically through a hole provided therefor in leg 43 of the support 21. The rod 36 terminates with a laterally extended strip 37 of spring steel or other highly elastic metal the end of which bears against the lip of the mold 22.

In operation, the subatmospheric pressure induced within the chamber 10 by the suction tube 20 creates a continuous high speed inflow of air through the tube 16. A gob of molten glass severed from the glass rod 17 by the flame of the burners 19 is drawn into the receiving end 40 of the tube 16 and is propelled through the tube by the flow of air to strike within the mold 22 with a force sufficient to cause the gob immediately to assume the shape of the mold. Coincidentally with its shaping the gob is cooled by contact with the mold and the inflowing air from the tube 16. The molded glass article in the present instance is a bearing jewel and has the form which is illustrated in exaggerated cross section in Fig. 2.

The mold is evacuated by applying pressure to the knob 31, whereupon the side arm 35 moves to engage the pin 24 and thereby lift the bottom 23 with the shaped glass article upon it. At the same time the elastic strip 37 actuated by the rod 36 moves up and across the face of the mold 22 displacing the shaped glass article from the elevated mold bottom 23. The displaced glass article falls to the bottom of the chamber 10 and passes into the air lock 27 through the opening left by the valve 28 which was lifted from its seat when the knob 31 was pressed, as mentioned above. When pressure is removed from the knob, the spring 34 acts to return the valves and other moving parts to their normal position. The vent 26 which had theretofore been closed by the valve 29 is thereupon opened and the glass article is free to pass through the vent 26 to the outer air.

It is to be understod that the molding of glass articles of such small magnitude as jewel bearings and the like must be accomplished at a very high rate of speed. The tiny gob cools so rapidly that very little time is available for transferring the gob to the mold and subsequently shaping it. It is an outstanding feature of my invention that by means of the apparatus hereinbefore described the gob can be conveyed to the mold in an incredibly short space of time and no additional time is required for shaping the gob in the mold. Speed sufficient for my purpose is to be obtained only by a pneumatic means for delivering the gob to the mold.

In the manipulation of applicant's apparatus, the velocity of the inflowing air and hence of the gob through the tube 16 may be regulated by and is proportional to the degree of reduction of pressure in the chamber 10 or the suction applied to the suction tube 20. I have found that too high a velocity results in too violent an impact of the glass with the mold and causes the molten glass to splash and form misshapen articles. As the size of the article and the gob increases, this consideration becomes more important. It is to be understood that other known means for feeding gobs of glass to the tube 16 may also be employed, thus permitting a more accurate control of the temperature and viscosity of the gob than can be achieved by the means shown, particularly when articles of larger size are to be made.

Although my invention has been illustrated in the drawing and described in the foregoing specification with particularity as an apparatus for the production of bearing jewels, it is to be understood that the apparatus is not so limited but may be used for the production of different and/or larger articles within the scope of the following claims.

The term "gob" is used herein with the meaning which it normally has in the glass working art and in the following claims a gob of glass means a discrete and unsupported mass of glass having substantially uniform viscosity throughout.

I claim:

1. In a glass shaping apparatus, a closed chamber, a vertically disposed gob delivery tube having its delivery end terminating inside said chamber, an open top mold within said chamber arranged below and spaced from the delivery end of said tube, and a suction line in communication with said chamber for creating a subatmospheric pressure therein to accelerate the delivery of a gob to said mold.

2. In a glass shaping apparatus, a closed chamber, a vertically disposed gob delivery tube having its delivery end terminating within said chamber, a mold having an open top and having a bottom movable vertically to the top thereof arranged within said chamber below and spaced from the delivery end of said tube a distance at least equalling the height of the mold cavity, a suction line in communication with said chamber for creating a subatmospheric pressure therein so as to create a high velocity air flow through said tube toward said mold and thus accelerate the delivery of a gob thereto, mechanism for elevating said mold bottom to raise a formed article clear of said mold, means for removing an article from the raised mold bottom, and means including said mechanism for providing a passage for the gravitational removal of an article from said chamber while the subatmospheric pressure is being maintained therein.

3. In a glass shaping apparatus an open top mold having a vertically movable bottom, a closed chamber containing the mold, a gob-delivery tube extending through a wall of the chamber and arranged in a position to deliver a gob to the mold, means for creating a subatmospheric pressure within the chamber whereby the movement of the gob through the tube and into the mold is accelerated as required to shape the gob into an article of the interior contour of the mold upon its deposit therein, means for raising said mold bottom to elevate the shaped article above the mold and for laterally discharging the article from the raised mold bottom, a relatively small chamber arranged below said closed chamber having a normally open passage to atmosphere and a normally closed passage to said closed chamber respectively affording a path for passing an article discharged from said mold bottom to atmosphere, said mold bottom raising means including means for closing the first passage and for opening the second passage while an article is being discharged from said mold bottom to clear the path for an article to said small chamber and for thereafter reclosing the second passage and opening the first passage to clear the path for the article to atmosphere while maintaining the subatmospheric pressure within said closed chamber.

HARRISON P. HOOD.

REFERENCES CITED

The following references are of record in the file of this patent:

UNITED STATES PATENTS

| Number | Name | Date |
|---|---|---|
| Re. 15,600 | Lorenz | May 15, 1923 |
| 1,742,098 | Rankin | Dec. 31, 1929 |
| 1,809,793 | Stenhouse et al. | June 9, 1931 |
| 1,831,548 | Slick | Nov. 10, 1931 |
| 1,845,491 | Eckert | Feb. 16, 1932 |
| 1,904,977 | Collins | Apr. 18, 1933 |
| 2,038,519 | Barnard | Apr. 28, 1936 |
| 2,076,502 | Moscini | Apr. 6, 1937 |
| 2,130,702 | Wadsworth | Sept. 20, 1938 |
| 2,274,105 | Stewart et al. | Feb. 24, 1942 |
| 2,333,076 | Stewart | Oct. 26, 1943 |